US008714572B1

(12) United States Patent
Singletary et al.

(10) Patent No.: US 8,714,572 B1
(45) Date of Patent: May 6, 2014

(54) SYSTEM AND METHOD TO LOWER AXLE/SPINDLES FOR GOLF CARS, PERSONAL TRANSPORTATION VEHICLES AND LOW SPEED VEHICLES

(71) Applicant: Textron Inc., Providence, RI (US)

(72) Inventors: Aric Singletary, Hephzibah, GA (US); Michael J. Hebert, Augusta, GA (US)

(73) Assignee: Textron Inc., Providende, RI (US)

( * ) Notice: Subject to any disclaimer, the term of this patent is extended or adjusted under 35 U.S.C. 154(b) by 0 days.

(21) Appl. No.: 13/718,187

(22) Filed: Dec. 18, 2012

(51) Int. Cl.
B60G 9/04 (2006.01)

(52) U.S. Cl.
USPC .................................. 280/124.113

(58) Field of Classification Search
USPC ........ 280/124.17, 124.175, 124.113, 124.125
See application file for complete search history.

(56) References Cited

U.S. PATENT DOCUMENTS

| | | | |
|---|---|---|---|
| 2,882,063 A | 4/1959 | Strasel | |
| 3,334,911 A | 8/1967 | Enters | |
| 3,908,480 A | 9/1975 | Afanador et al. | |
| 4,127,306 A | 11/1978 | Foster | |
| 5,199,730 A | 4/1993 | Westfall et al. | |
| 5,226,691 A | 7/1993 | Kane | |
| 5,466,051 A | 11/1995 | Liao | |
| 6,223,865 B1 * | 5/2001 | Lang et al. ................. | 188/73.31 |
| 6,299,259 B1 | 10/2001 | MacKarvich | |
| 6,941,634 B2 * | 9/2005 | Bigsby ....................... | 29/525.02 |
| 7,185,901 B1 | 3/2007 | Stimely | |

* cited by examiner

Primary Examiner — Faye M. Fleming
(74) Attorney, Agent, or Firm — Harness, Dickey & Pierce, P.L.C.

(57) ABSTRACT

A vehicle front lowering suspension system includes a main support structure made from a metal plate having front and side walls. A spindle support tube is fixedly connected to the main support structure having oppositely positioned first and second upturned ends. First and second shock absorber mounting arms are each fixedly connected at a connecting end to a first or second free end of a forward facing wall of the main support structure. The forward facing wall defines an integral extension of a plate material of the main support structure. A forward face of the spindle support tube is fixed to a rearward face of the forward facing wall.

22 Claims, 5 Drawing Sheets

SYSTEM AND METHOD TO LOWER AXLE/SPINDLES FOR GOLF CARS, PERSONAL TRANSPORTATION VEHICLES AND LOW SPEED VEHICLES

FIELD

The present disclosure relates to suspension systems for low speed vehicles including golf cars and personal transportation vehicles.

BACKGROUND

This section provides background information related to the present disclosure which is not necessarily prior art.

Known suspension systems for low speed vehicles such as golf cars include structure supporting leaf springs and shock absorbers, and include spindles connected to axles controlling an elevation of the vehicle in relation to a ground surface. Vehicle ground clearance is predicated on the combination of these features, and can result in issues related to the ease of user entry and exit from the vehicle, vehicle stability, cornering ability and/or the space envelope required to transport the vehicle. In general, greater ground clearance reduces cornering ability at increasing speeds and therefore reduces vehicle stability.

Known modifications to reduce ground clearance include inversion of the leaf springs. This modification, however, limits the front suspension and shock absorber travel distance at full compression and transfers more or most of the suspension load to the shock absorbers. This modification reduces suspension travel, can negatively affect ride quality, and can further result in reduced life of the leaf springs and/or shock absorbers.

SUMMARY

This section provides a general summary of the disclosure, and is not a comprehensive disclosure of its full scope or all of its features.

According to several aspects, a vehicle front lowering suspension system includes a main support structure having a front wall. A spindle support tube is fixedly connected to the main support structure having oppositely positioned first and second upturned ends. A first shock absorber mounting arm is fixedly connected at a connecting end to a first free end of a forward facing wall of the main support structure. A second shock absorber mounting arm is fixedly connected at a connecting end to a forward facing wall second free end of the of the main support structure.

According to further aspects, a vehicle front lowering suspension system, includes a main support structure made from a metal plate having a forward facing wall. A spindle support tube having oppositely positioned first and second upturned ends is fixedly connected to the main support structure. A forward facing wall of the main support structure defines an integral extension of a plate material of the main support structure. A forward face of the spindle support tube is fixed to a rearward face of the forward facing wall.

According to additional aspects, a vehicle front lowering suspension system includes a main support structure made from a metal plate having front and side walls. A substantially rectangular shaped spindle support tube having oppositely positioned first and second upturned ends is fixedly connected to the main support structure. A first shock absorber mounting arm is fixedly connected at a connecting end to a first free end of a forward facing wall of the main support structure. The forward facing wall defines an integral extension of a plate material of the main support structure. A second shock absorber mounting arm is fixedly connected at a connecting end to a second free end of the forward facing wall of the of the main support structure. A forward face of the spindle support tube is fixed to a rearward face of the forward facing wall.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
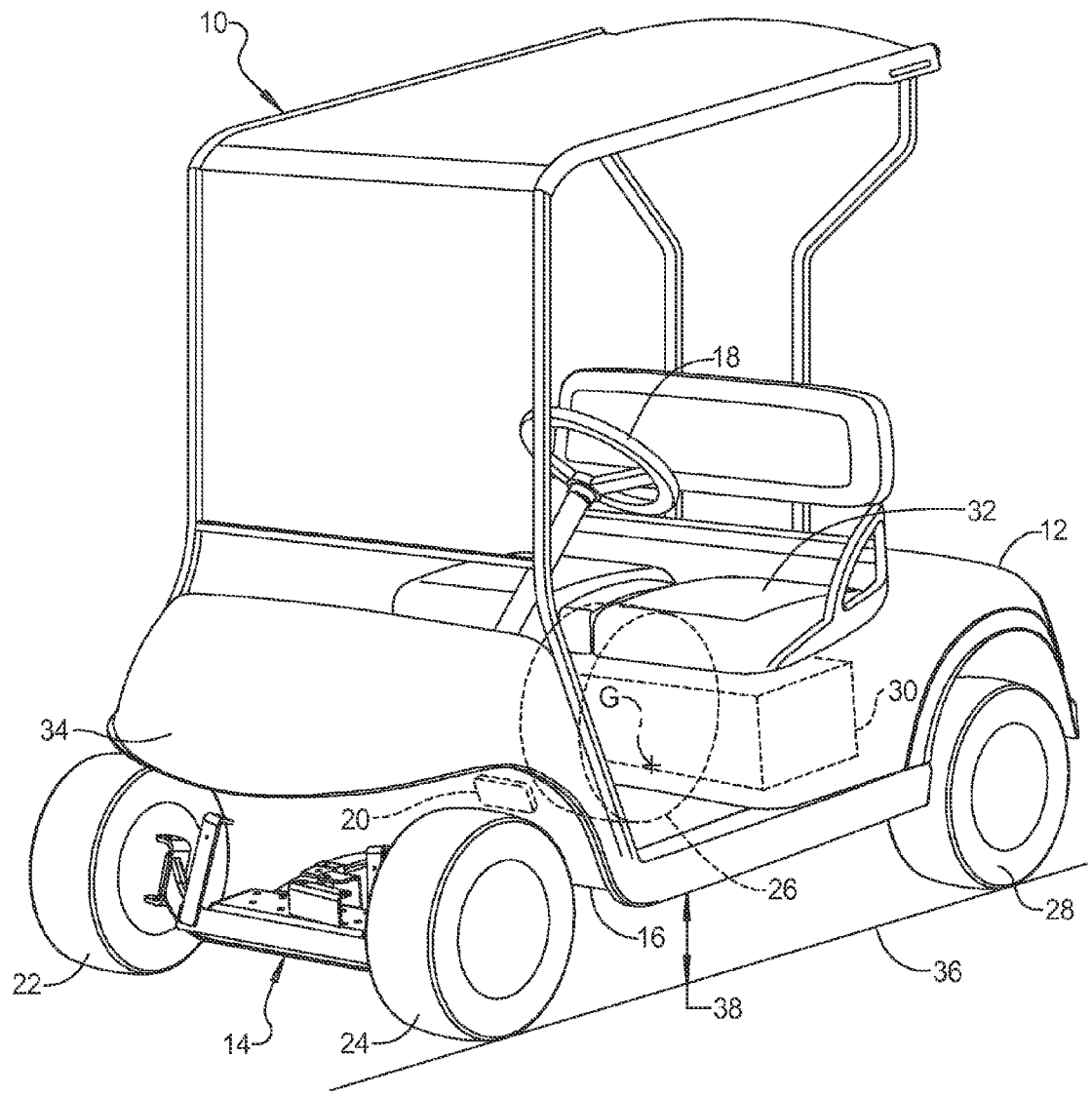
FIG. 1 is a front left perspective view of a golf car vehicle having a front lowering suspension system of the present disclosure.

Referring to FIG. 1, a low speed vehicle 10 includes a body 12 supported by a front lowering suspension system 14 of the present disclosure. Vehicle 10 is generally depicted as a golf car, however other low speed vehicles can include suspension system 14 in addition to golf cars including but not limited to personal transportation vehicles, off-road vehicles, and/or all-terrain vehicles or the like. Vehicle 10 includes body 12 supported on a frame 16, a steering system 18, a braking system 20 and both front steerable wheels 22, 24 and rear wheels 26, 28. Any or all the wheels can be directly propelled wheels, powered by a commonly known propulsion system 30 (shown in phantom) such as a battery system powering an electric motor, a gasoline engine connected to a transmission, or a pressurized fuel powered engine connected to a transmission. Propulsion system 30 can be positioned anywhere in vehicle 10, and is commonly positioned below a seat 32 in a golf car use. "Low speed" vehicles as referred to herein such as golf cars are generally vehicles with operating speeds ranging between approximately 0 to 20 mph, however vehicle speeds higher than 20 mph are within the scope of the present disclosure.

The front lowering suspension system 14 of the present disclosure is shown in FIG. 1 without associated suspension or steering components for clarity. Suspension system 14 is capable of lowering a front end 34 of vehicle 10 with respect to a ground surface 36 by reducing a ground clearance 38 between frame 16 and the ground surface 36 by approximately 2 in. (5.1 cm). This reduction in ground clearance lowers a center of gravity "G" of the vehicle 10, thereby making the vehicle more stable in turns.

Figure 7:
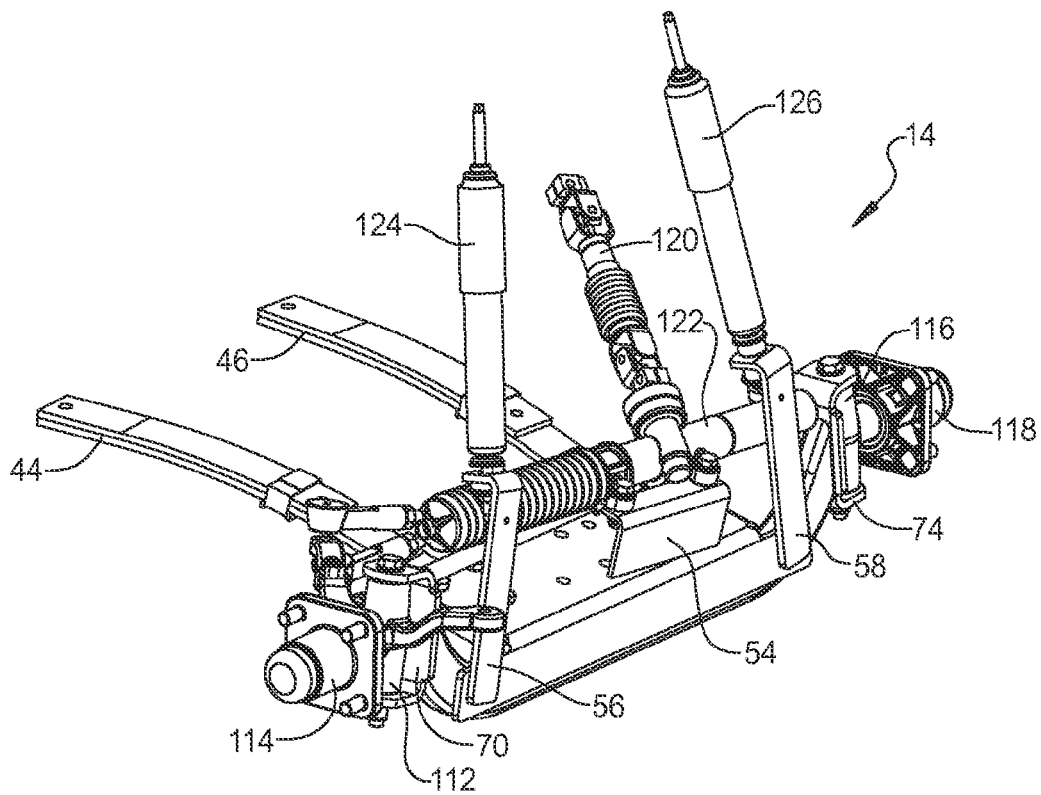
FIG. 7 is a top front right perspective view of the front lowering suspension system of FIG. 2 with suspension components connected thereto.

Referring to FIG. 2 and again to FIG. 1, front lowering suspension system 14 incorporates multiple features which permit the level lowering capability while providing for structural rigidity similar to known rectangular tube front support assemblies. These include a main support structure 40 which according to several aspects can be made from a metal plate having one or more bent or formed front and/or side walls which will be described in greater detail in reference to FIGS. 3-5. A substantially rectangular shaped spindle support tube 42 is fixedly connected to main support structure 40 which provides for axle support for the front steerable wheels 22, 24. First and second springs 44, 46 such as leaf or coil springs are each connected using fasteners 48 to both a planar plate portion 50 of main support structure 40 and to the frame 16 of vehicle 10. Individual first and second support brackets 52, 54 are fixedly connected to planar plate portion 50 for support of steering control components to be described in reference to FIG. 7. A first shock absorber mounting arm 56 is fixedly connected at a connecting end 58 to a first free end 60 of a forward facing wall 62 of main support structure 40, which can be an integral extension of the plate material of main support structure 40 created for example in a bending operation, or separately fixed such as by welding to main support structure 40. Similarly, a second shock absorber mounting arm 64 is fixedly connected at a connecting end 66 to a second free end 68 of forward facing wall 62 of main support structure 40.

A first spindle mount bracket 70 is fixedly connected to a first upturned end 72 of spindle support tube 42. A second spindle mount bracket 74 is oppositely fixedly connected to a second upturned end 76 of spindle support tube 42. The spindle support tube 42 can include reinforced walls such as opposed first and second walls 78, 80 that extend for substantially an entire length of spindle support tube 42. A forward face 82 of spindle support tube 42 can also be fixed, for example by welding or brazing to a rearward face of wall 62.

Figure 3:
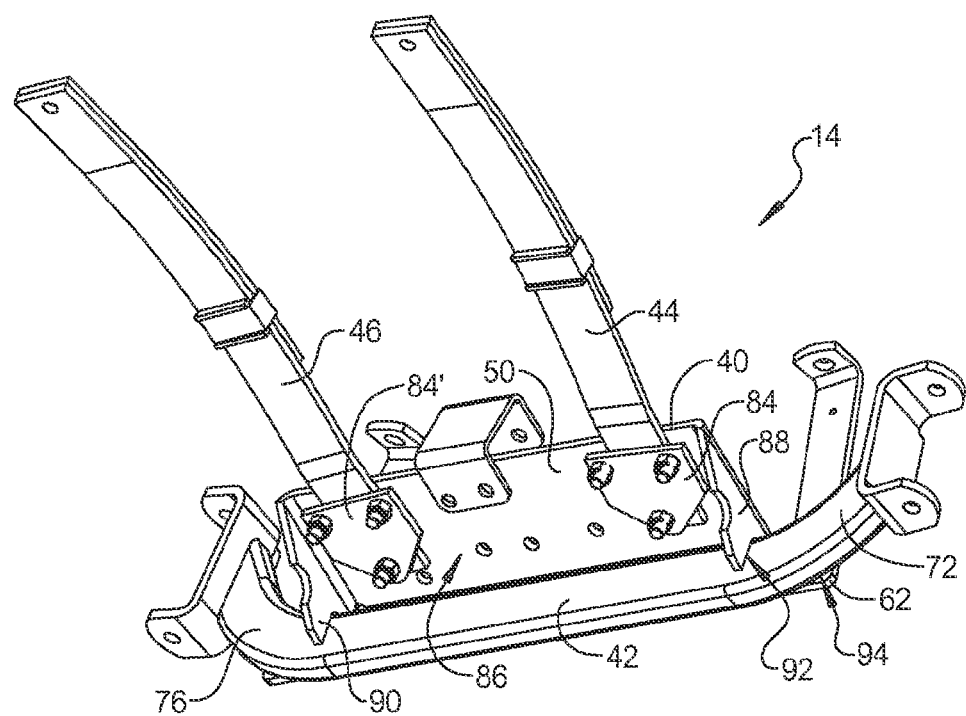
FIG. 3 is a bottom rear right perspective view of the front lowering suspension system of FIG. 2.
Figure 4:
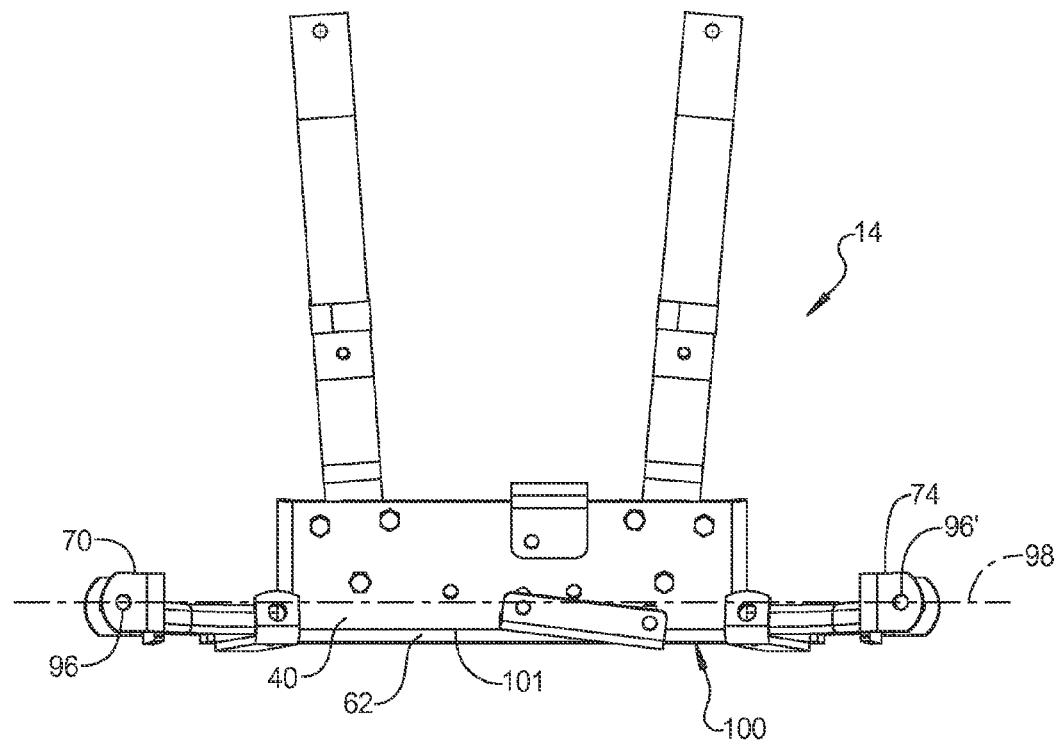
FIG. 4 is a top plan view of the front lowering suspension system of FIG. 2.

Referring to FIG. 3, each of the first and second springs 44, 46 are connected to planar plate portion 50 of main support structure 40 using a reinforcing plate 84, 84' which expand the connecting footprint and distribute the load of the first and second springs 44, 46. The spindle support tube 42 is also further fixedly connected to and supported by first and second side walls 88, 90 integrally extending from planar plate portion 50 of main support structure 40. For example, spindle support tube 42 is fixed by welding to an edge 92 of first side wall 88. Each of the first and second upturned ends 72, 76 of spindle support tube 42 are positioned outward of the first and second side walls 88, 90.

Figure 2:
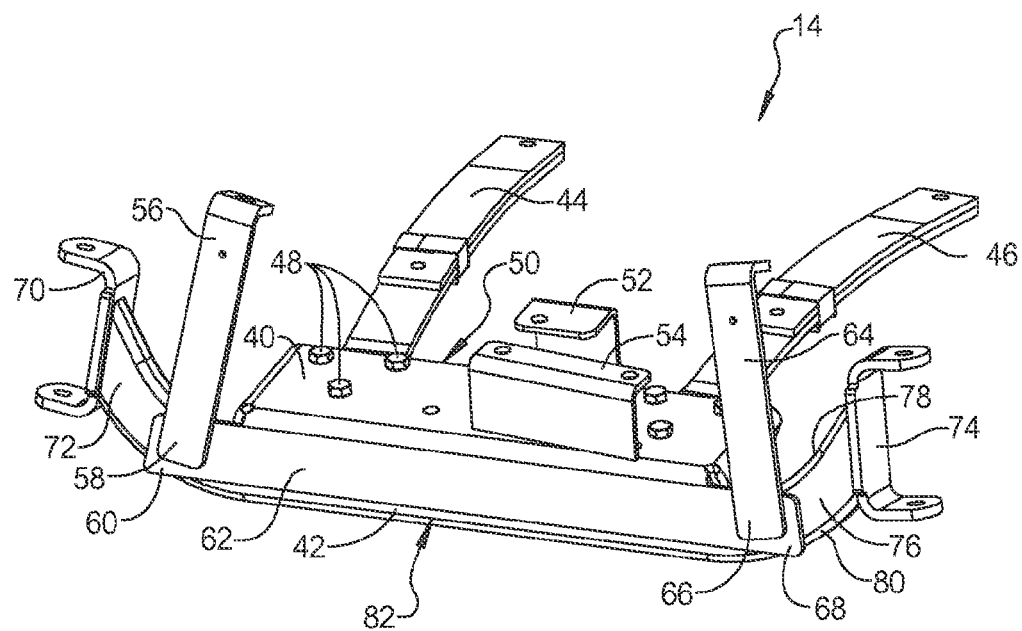
FIG. 2 is a top front left perspective view of the front lowering suspension system of the present disclosure.

Referring to FIG. 4 and again to FIGS. 1 and 2, the first and second spindle mount brackets 70, 74 each include apertures 96, 96' which are axially aligned with an axis 98. Axis 98 is oriented parallel with respect to a forward face 100 of forward facing wall 62 to maintain alignment of the front steerable wheels 22, 24. The forward facing wall 62 is integrally connected at a joint 101 to the main support structure 40, which according to several embodiments can be a bending joint or a welding joint.

Figure 5:
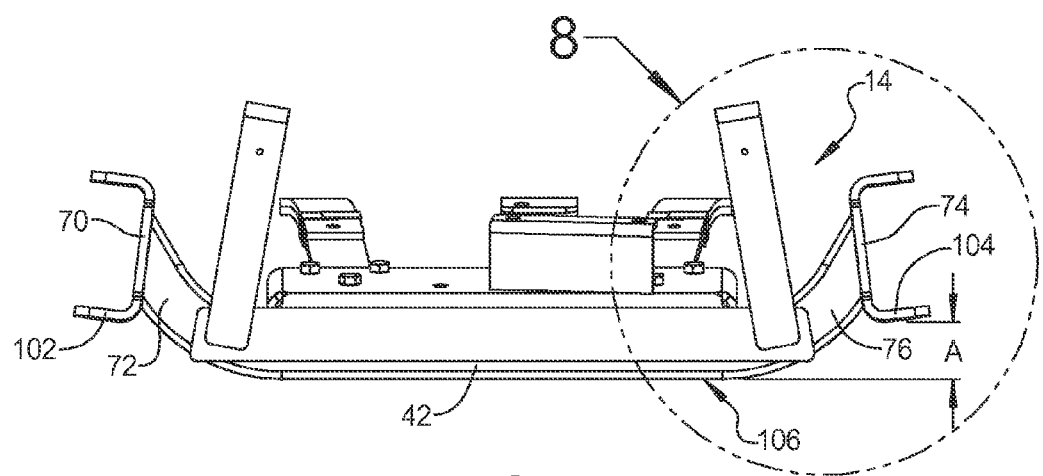
FIG. 5 is a front elevational view of the front lowering suspension system of FIG. 2.

Referring to FIG. 5, the first spindle mount bracket 70 includes a lower positioned first bracket leg 102 which is elevated with respect to a lower planar face 106 of spindle support tube 42. Similarly, the second spindle mount bracket 74 includes a lower positioned first bracket leg 104 which is elevated with respect to lower planar face 106 of spindle support tube 42. The first bracket legs 102, 104 are oppositely directed with respect to each other, but both are equally spaced at a distance "A" above the lower planar face 106 of spindle support tube 42.

Figure 6:
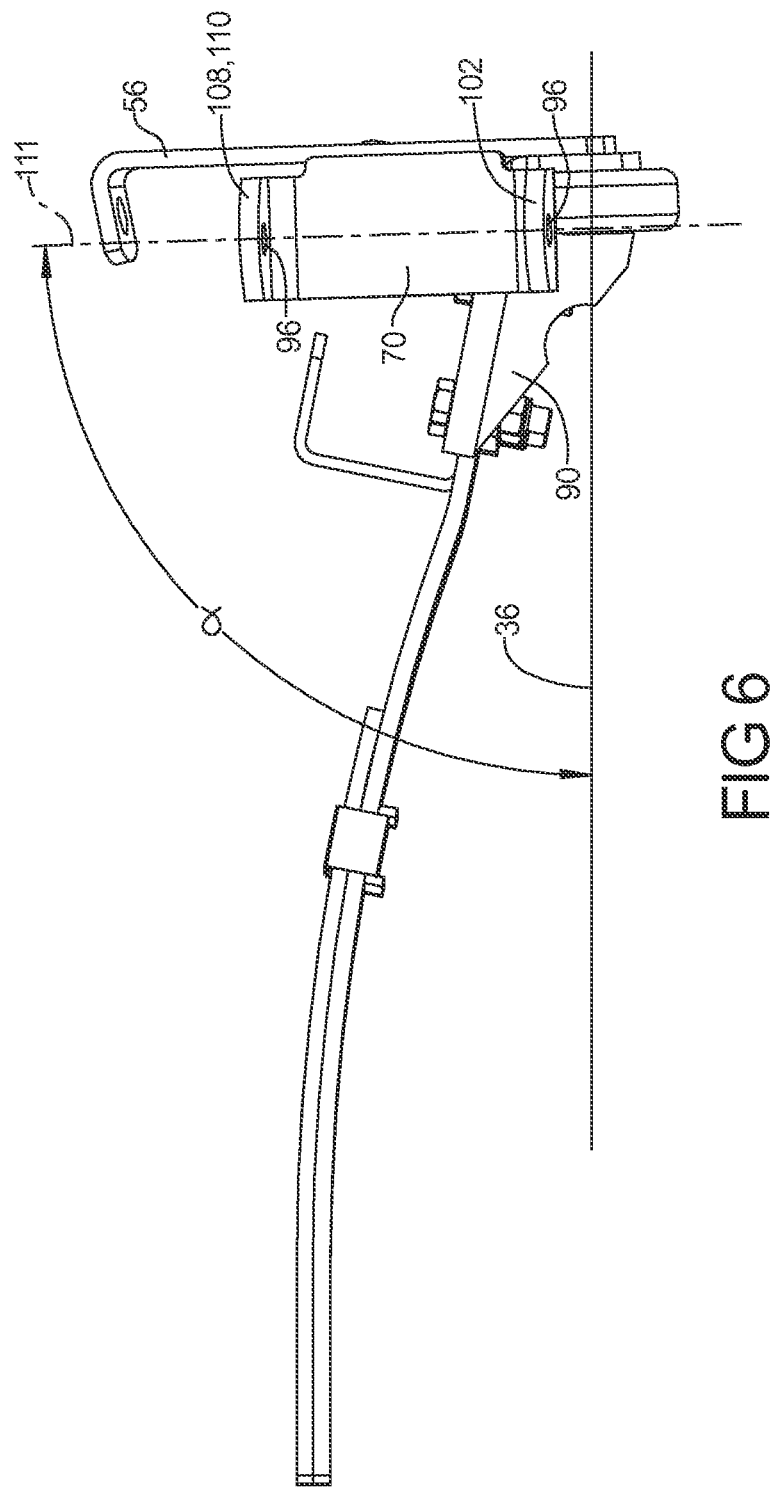
FIG. 6 is a left side elevational view of the front lowering suspension system of FIG. 2.

Referring to FIG. 6 and again to FIGS. 2 and 5, in addition to the first bracket leg such as first bracket leg 102, each of the first and second spindle mount brackets 70, 74 (only first spindle mount bracket 70 is clearly visible in this view) also includes a second bracket leg 108, 110 (only second bracket leg 108 is visible in this view). Apertures 96, 96" created in each of the paired first and second bracket legs are coaxially aligned on a common spindle axis 111. The spindle axis 111 is oriented at an acute angle alpha ($\alpha$) with respect to the plane defined by ground surface 36.

Referring to FIG. 7 and again to FIGS. 1 and 2, suspension and steering components commonly mounted to front lowering suspension system 14 include a front right spindle 112 connected to a front axle/bearing assembly 114 which are rotatably connected to first spindle mount bracket 70. Similarly, but oppositely directed are a front left spindle 116 connected to a front axle/bearing assembly 118 which are rotatably connected to second spindle mount bracket 74. A steering control column 120 is connected both to the steering system 18 and to a rack and pinion gear system 122. Rack and pinion gear system 122 is mounted to the first and second support brackets 52, 54 (only second support bracket 54 is clearly visible in this view) and connected to each of the front right and left spindles 112, 116. A first shock absorber 124 is connected to a free end of first shock absorber mounting arm 56. A second shock absorber 126 is connected to a free end of second shock absorber mounting arm 64.

Figure 8:
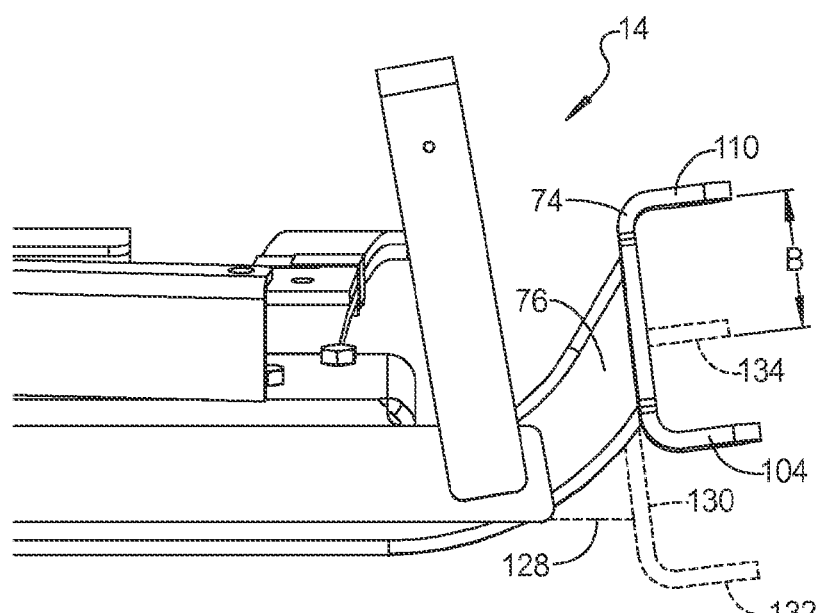
FIG. 8 is a front elevational view of the front lowering suspension system taken at area 8 of FIG. 5.

Referring to FIG. 8, a comparison is drawn between the differences in height provided by a conventional suspension system and the front lowering suspension system 14 of the present disclosure. The conventional suspension system shown in phantom includes a horizontally oriented rectangular tube 128 which is connected to a spindle mount bracket 130 similar to second spindle mount bracket 74, therefore including a first bracket leg 132 and an upper or second bracket leg 134. The difference in frame support height provided by the front lowering suspension system 14 of the present disclosure is clearly depicted between the position of second bracket leg 134 compared to second bracket leg 110 of the present disclosure, which provides a change in elevation "B" of approximately 2 in. The change in elevation "B" derives in part from the geometry of the upturned ends such as second upturned end 76 of spindle support tube 42, while front lowering suspension system 14 provides at least equal suspension system travel from its suspension components.

Front lowering suspension systems of the present disclosure provide a system and method to lower the front end of a golf car, personal transportation vehicle or low speed vehicle. The front lowering suspension system 14 can be combined with a rear end lowering system or device known in the industry to lower a rear end of the vehicle approximately the same amount as achieved by the front lowering system 14. Use of a rear end lowering system or device will maximize the benefits of lowered vehicle center of gravity, and improve steering, handling, and ease of entry/exit, as well as improving vehicle stability.

The front lowering suspension system 14 lowers the front end of the vehicle to allow easier occupant entrance and exit. The front lowering suspension system 14 also decreases a distance between the cowl of the vehicle and the front axles as compared to the similar distance of a standard golf car. This is achieved by replacing the complete front axles and/or spindles with a new lowered axle assembly at the vehicle front end. Advantages to this system further include: 1) ease of entry and exit compared to standard golf cars by reducing vehicle ground clearance; 2) a unique lowered look or appearance for the vehicle 10 including a reduced space between the wheel openings and the tires; 3) vehicle stability is increased due to the lowered ground clearance; 4) cornering ability is increased by a lower center of gravity "G" of the vehicle; and 5) a vehicle having the present lowered axle system is easier to transport in an enclosed trailer.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle front lowering suspension system, comprising:
   a main support structure having a forward facing wall;
   a spindle support tube fixedly connected to the main support structure having oppositely positioned first and second upturned ends;
   a first shock absorber mounting arm fixedly connected at a connecting end to a first free end of the forward facing wall of the main support structure; and
   a second shock absorber mounting arm fixedly connected at a connecting end to a second free end of the forward facing wall of the main support structure.

2. The vehicle front lowering suspension system of claim 1, wherein the forward facing wall is connected at a bending joint to the main support structure, the forward facing wall thereby defining an integral extension of a plate material of the main support structure.

3. The vehicle front lowering suspension system of claim 1, wherein the forward facing wall is connected at a welding joint to the main support structure, the forward facing wall thereby defining an integral extension of a plate material of the main support structure.

4. The vehicle front lowering suspension system of claim 1 further comprising first and second springs, the first and second springs being leaf springs, wherein each leaf spring is connected using fasteners to a planar plate portion of the main support structure.

5. The vehicle front lowering suspension system of claim 4, further including individual first and second support brackets fixedly connected to the planar plate portion and adapted to support a steering control system.

6. The vehicle front lowering suspension system of claim 1, further including:
   a first spindle mount bracket fixedly connected to the first upturned end of the spindle support tube; and
   a second spindle mount bracket oppositely fixedly connected to the second upturned end of spindle support tube.

7. The vehicle front lowering suspension system of claim 1, wherein the spindle support tube is substantially rectangular shaped and includes rounded reinforced walls including opposed first and second walls that extend for substantially an entire length of the spindle support tube.

8. The vehicle front lowering suspension system of claim 1, wherein a forward face of the spindle support tube is fixed to a rearward face of the forward facing wall.

9. The vehicle front lowering suspension system of claim 1, wherein the main support structure further includes integrally connected and opposed first and second side walls connected to the spindle support tube.

10. A vehicle front lowering suspension system, including:
   a main support structure made from a metal plate having a forward facing wall;
   a spindle support tube having oppositely positioned first and second upturned ends fixedly connected to the main support structure;
   a forward facing wall of the main support structure defining an integral extension of a plate material of the main support structure; and
   a forward face of the spindle support tube fixed to a rearward face of the forward facing wall.

11. The vehicle front lowering suspension system of claim 10, wherein main support structure includes opposed first and second side walls integrally extending from a planar plate portion of the main support structure, the spindle support tube being fixedly connected to and supported by the first and second side walls.

12. The vehicle front lowering suspension system of claim 11, wherein the spindle support tube is substantially rectangular shaped and is fixed by welding to an edge of the first side wall.

13. The vehicle front lowering suspension system of claim 11, wherein each of the first and second upturned ends of the spindle support tube is positioned outward of one of the first or second side walls.

14. The vehicle front lowering suspension system of claim 10, further including:
   a first shock absorber mounting arm fixedly connected at a connecting end to a first free end of the forward facing wall of the main support structure, defining an integral extension of a plate material of the main support structure; and
   a second shock absorber mounting arm fixedly connected at a connecting end to a second free end of the forward facing wall of the main support structure.

15. The vehicle front lowering suspension system of claim 10, further comprising first and second springs connected to planar plate portion of the main support structure using a reinforcing plate acting to expand a connecting footprint and distribute a load of the first and second springs.

16. A vehicle front lowering suspension system comprises:
   a main support structure made from a metal plate having front and oppositely positioned first and second side walls;
   a substantially rectangular shaped spindle support tube having oppositely positioned first and second upturned ends fixedly connected to the main support structure;
   a first shock absorber mounting arm fixedly connected at a connecting end to a first free end of a forward facing wall of the main support structure, the forward facing wall defining an integral extension of a plate material of the main support structure;
   a second shock absorber mounting arm fixedly connected at a connecting end to a second free end of the forward facing wall of the of the main support structure; and
   a forward face of the spindle support tube fixed to a rearward face of the forward facing wall.

17. The vehicle front lowering suspension system of claim 16, further including:
   a first spindle mount bracket fixedly connected to the first upturned end of the spindle support tube; and
   a second spindle mount bracket oppositely fixedly connected to the second upturned end of spindle support tube.

18. The vehicle front lowering suspension system of claim 17, wherein:
   the first spindle mount bracket includes a lower positioned first bracket leg which is elevated with respect to a lower planar face of the spindle support tube; and
   the second spindle mount bracket includes a lower positioned first bracket leg which is elevated with respect to the lower planar face of spindle support tube.

19. The vehicle front lowering suspension system of claim 18, wherein the first bracket legs of the first and second spindle mount brackets are oppositely directed with respect to each other, and both are equally spaced at a distance above the lower planar face of the spindle support tube.

20. The vehicle front lowering suspension system of claim 18, wherein each of the first and second spindle mount brackets further includes a second bracket leg.

21. The vehicle front lowering suspension system of claim 18, further including apertures created in paired ones of the first and second bracket legs coaxially aligned on a common spindle axis.

22. The vehicle front lowering suspension system of claim 21, wherein the spindle axis is oriented at an acute angle alpha with respect to a plane defined by a ground surface.

* * * * *